United States Patent [19]
Khuwatsamrit

[11] Patent Number: 5,742,150
[45] Date of Patent: Apr. 21, 1998

[54] POWER SUPPLY AND METHOD OF PROTECTING BATTERIES THEREIN

[76] Inventor: Thakoengdet Khuwatsamrit, 197 Honey Tree Dr., Athens, Ga. 30605

[21] Appl. No.: 713,126

[22] Filed: Sep. 16, 1996

[51] Int. Cl.⁶ .................................................. H01M 10/46
[52] U.S. Cl. ........................... 320/116; 320/118; 320/121
[58] Field of Search ............................ 320/5, 6, 7, 8, 320/14, 15, 17, 18, 29, 30, 39, 43

[56] References Cited

U.S. PATENT DOCUMENTS

| | | | |
|---|---|---|---|
| 4,061,955 | 12/1977 | Thomas et al. | 320/6 |
| 4,238,721 | 12/1980 | DeLuca et al. | 320/18 |
| 4,281,277 | 7/1981 | Lakey | 320/6 |
| 4,303,877 | 12/1981 | Meinhold | 320/18 X |
| 4,484,140 | 11/1984 | Dieu | 324/434 |
| 4,633,418 | 12/1986 | Bishop | 364/554 |
| 4,719,401 | 1/1988 | Altmejd | 320/6 X |
| 4,820,966 | 4/1989 | Fridman | 320/32 |
| 4,871,956 | 10/1989 | Barrella | 320/13 |
| 5,206,578 | 4/1993 | Nor | 320/14 |
| 5,387,857 | 2/1995 | Honda et al. | 320/18 |
| 5,438,250 | 8/1995 | Retzlaff | 320/17 |
| 5,498,950 | 3/1996 | Ouwerkerk | 320/18 |
| 5,532,572 | 7/1996 | Okamura | 320/14 |
| 5,631,534 | 5/1997 | Lewis | 320/6 |

*Primary Examiner*—Edward Tso
*Attorney, Agent, or Firm*—Kennedy, Davis & Kennedy

[57] ABSTRACT

Batteries in a battery string are provided with shunt circuits that shunt current about a battery when it is charged to an upper charge limit or discharged to a lower charge limit. The shunt circuits include an inductor and a switching network.

8 Claims, 7 Drawing Sheets

POWER SUPPLY AND METHOD OF PROTECTING BATTERIES THEREIN

TECHNICAL FIELD

This invention relates generally to power supplies comprised of a number of batteries connected in series circuit. More specifically, the invention relates to methods and circuits for use in preventing individual batteries in a battery string from becoming overcharged during charging and from being excessively charge depleted during discharge.

BACKGROUND OF THE INVENTION

In motive and standby applications, battery modules or monoblocks are connected in series to provide a desired voltage level for the applications. For example, battery powered vehicles have power supplies formed with a large number of batteries or modules connected in series circuit as a battery string. More than one of those series connected battery strings is sometimes connected in parallel to increase the current delivery capacity. Most of these battery systems in use today are operating without individual battery module management. These conventionally unmanaged and uncontrolled power supplies lead to unequally charge states, overcharge and undercharge, among individual battery modules in the string. Overcharged modules lose service life while uncharged ones lose energy storage capacity.

These unequalized charge state problems with individual battery modules in a string have been addressed previously. For example, in U.S. Pat. No. 5,438,250, individual module voltage is monitored. The main charger current is controlled in such a way that none of the battery module voltage rises above its limit. Incompletely charged modules are recharged individually using a relatively smaller independent charger. Another battery management system monitors individual module voltage and provides relatively slow boost charges to equalize module voltages in a float charge state with an alarm provided for activation should any module within the string become overcharged or undercharged beyond preset limits. In U.S. Pat. No. 4,719,401, a special zenor diode is shown used as such a shunt. However, it cannot control the voltage level and is useful essentially only for the charging mode or where a module has completely failed to an open circuit condition.

These prior circuits for monitoring and protecting the individual batteries in a battery string have had major limitations that have inhibited their commercialization. For that reason today most battery strings remain without individual battery monitoring and current management means. These persistent problems and limitations have included the cost of circuits which are capable of switching individual batteries out of the string. Others have only been capable of managing string charge. Still others that have monitored discharge have only effectively removed an overdrained battery from the string once it has virtually reached an open circuit state.

It thus is seen that a need remains for a method and means for monitoring the individual batteries in a battery string and for preventing each from achieving an overcharge condition during string charge and for preventing each from discharging below a selected minimum potential during discharge. Accordingly, it is to the provision of such that the present invention is primarily directed.

SUMMARY OF THE INVENTION

Briefly described, the individual batteries in a battery string are prevented from being overcharged during string charge or excessively charge depleted during string discharge by monitoring their charge potential. Once that potential is detected as having reached a charge limit, a shunt current is generated about that battery of an effective magnitude approximately equal to the level of current in the string. This causes the current level through that battery to drop to substantially zero effectively removing that battery from the string without actually disconnecting it from the string as with a switch. This is accomplished by cyclically charging and discharging inductors that are switched into parallel circuits with the batteries in response to their charge being sensed as having reached an upper or lower limit.

DETAILED DESCRIPTION

Figure 1:
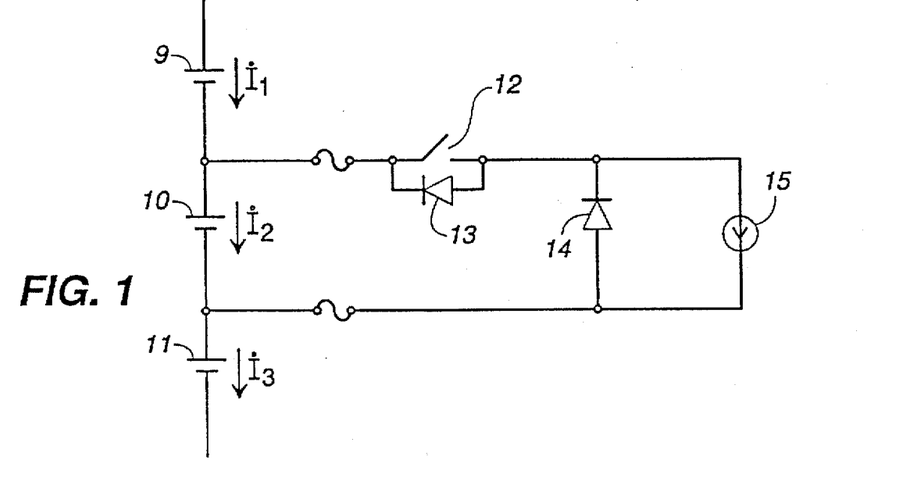
FIG. 1 is a schematic diagram that illustrates principles of the invention in a battery string charge mode of string operation.
Figure 2:
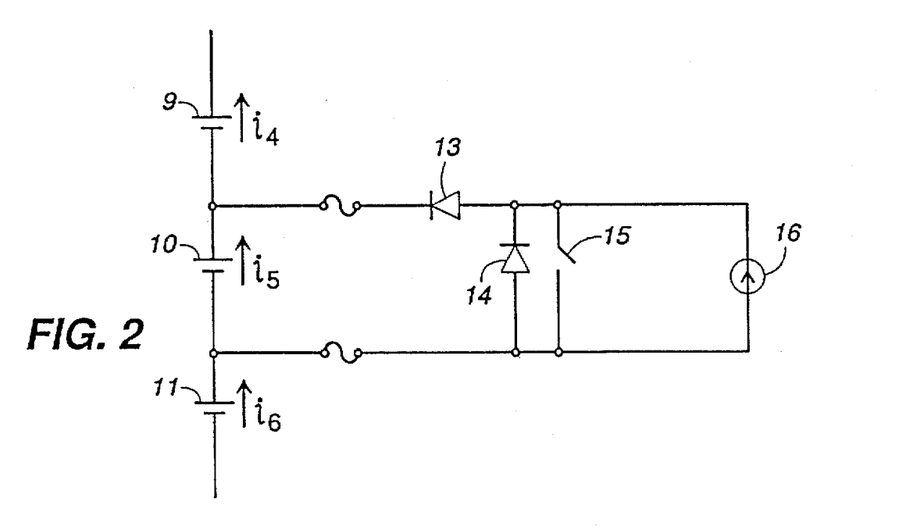
FIG. 2 is a schematic diagram showing the theory of operation of the invention in a battery string loaded or discharge mode of string operation.

With reference next to the drawing a basic understanding of principles of the invention may be had by reference to FIGS. 1 and 2. FIG. 1 shows a power supply comprised of three batteries 9, 10, 11 connected in series circuit in need of charging, say to a fully charged level of 12.8 VDC. Now suppose the point is reached where battery 10 is fully charged to 12.8 volts but battery 9 is only yet charged to 12.2 volts and battery 10 is only yet charged to 12.5 volts. If the charging current is 10 amps, ideally 10 amps should now flow through battery 9 ($i_1$=10), zero amps through the fully charged battery 10 ($i_2$=0), and 10 amps through battery 11 ($i_3$=10). If a control current source of effectively 10 amps on average is provided at 15 in the protective circuit shown in parallel with battery 10, an ideal situation will exist. Note that this cannot be done by merely shunting the battery with a by-pass conductor since that would short the battery.

Heretofore this has been done with costly circuitry and networks such as that shown in U.S. Pat. No. 4,061,955 of Thomas et al. This approach has involved the use of circuits that sense the voltage across the battery and in response to a sensed full voltage charge switching the charged battery out of the string. However the circuit of FIG. 1, where 14 represents a free wheeling diode, would theoretically accomplish this without removing the battery from the string. Similarly, FIG. 2 theoretically illustrates 16 as a current source in the battery string discharging mode of operation such that $i_6$ and $i_4$ and current source 16 are all 10 amps effectively and $i_5$ is 0 amps when battery 10 has failed or is approaching failure. Here again 13 represents a free wheeling diode. Thus in both the theoretical string charging mode shown in FIG. 1 and the theoretical string discharging mode shown in FIG. 2, a current source is effectively created at 15 and 16 effectively equal to that of $i_1$, $i_3$ and $i_4$, $i_6$, respectively. This represents basic principles of the invention.

Figure 3:
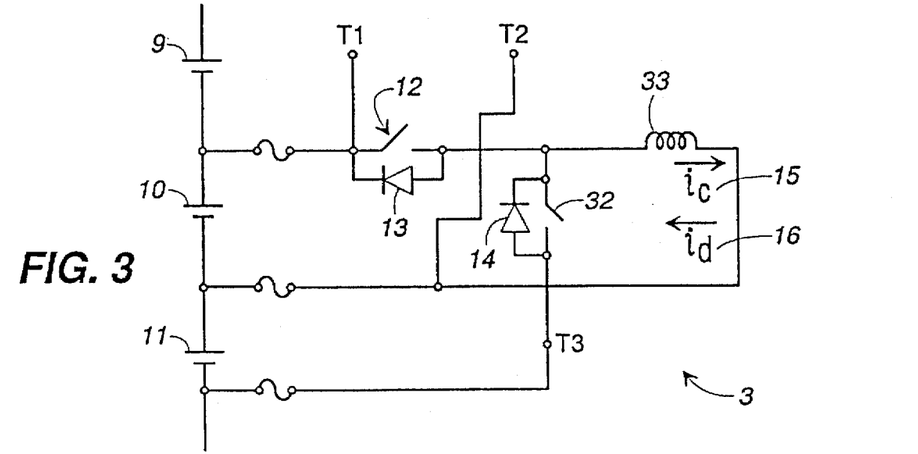
FIG. 3 is a diagram of a circuit used in protecting an individual battery in a battery string that embodies principals of the invention in a preferred form that includes circuit means for protecting the battery from both being excessively charged or excessively discharged.

With reference next to FIG. 3, an implementing circuit is shown that is effective for both the string charging and discharging modes of operation once again with regard to battery 10. Although the circuit is shown just with regard to this single battery 10, it should be understood that each of the batteries in the string may be provided with such a circuit.

In FIG. 3 battery 10 is shown with an implementing circuit comprised of an inductor 33 connected across it through a switch 12 that is in parallel with a diode 13. A connection is also provided at a point between switch 12 and inductor 33 and a point in the battery string beyond the next battery 11 in the string. This connection has a switch 32 in parallel with a diode 14. Should battery 10 become fully charged before others are in the string in the string charging mode, the threshold voltage level is reached which closes switch 12 thereby activating the protective circuit. The control circuit for switch 12 is not shown here for ease of understanding. Switch 12 is also controlled by peak current flow in the inductor across battery 10, as also hereafter described. In a repetitive manner the inductor 33 becomes charged until a peak current level is reached, say 15 amps, which causes switch 12 to open momentarily. The energy now stored in the inductor is discharged whereupon charging current $i_c$ (15) flows. As this flow decreases with the discharge of the inductor to a low threshold level, switch 12 is again closed. This cycle is repeated yielding an average current flow in the loop that approximately matches the current flow through batteries 9 and 11. In this manner the current flow through battery 10 is maintained at or near zero. In the discharge mode of operation the circuit operates in reverse to produce the discharge current $i_d$ from the same inductor 33.

Figure 4:
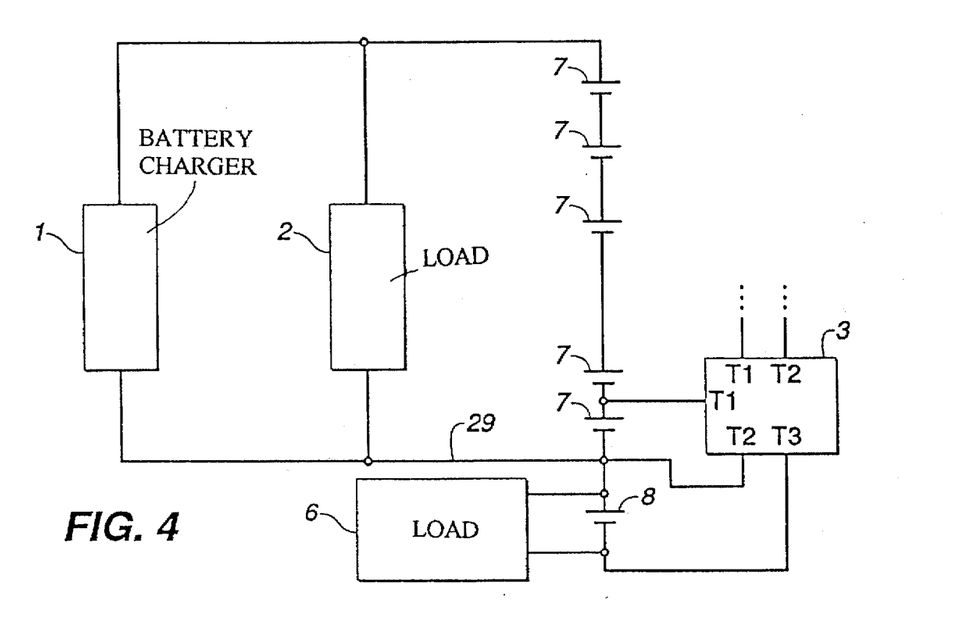
FIG. 4 is a circuit diagram showing a battery string coupled with a string charger and load together with a sump battery.

With reference next to FIG. 4, a power supply string of five batteries 7 is shown schematically coupled across both a battery charger 1 and a load 2. Each of these batteries 7 is protected with the circuit of FIG. 3. Note, however, that there is also a most negative battery 8 which is referred to as the sump battery, which is in series with the string but not across the charger 1 or the load 2. This sump battery is provided for the contingency that the most negative battery 7 in the string becomes overcharged. In that event the sump battery 8 serves to receive the excess energy shunted about that most negative of the batteries 7. A load for energy dissipation and charge controller represented at 6 is coupled across the sump battery 8. A regenerative DC drive or voltage regulator may be used as this charge controller. The sump battery serves as both an overall source and sump for the controlled current sources for the entire string.

Figure 7:
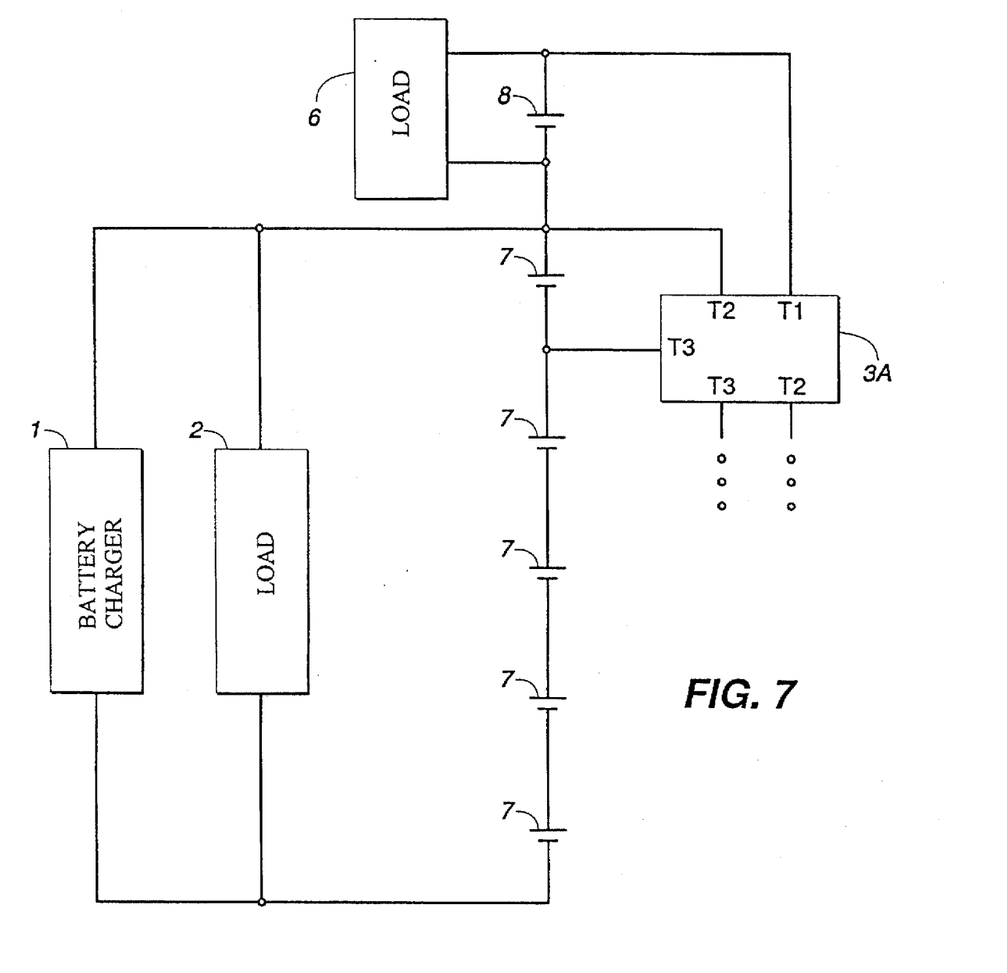
FIG. 7 is another circuit diagram showing a battery string coupled with a string charger and load together with a sump battery.

The circuit of FIG. 7 is the counterpart of that of FIG. 4 where the sump battery 8 is connected to the most positive end of the battery string. Here charge is transferred from and to the most positive battery 7 (battery 9 in the other figures) instead of the most negative battery 7 (battery 11 in the other figures). Thus, the charge transfer can be done either to the next one up or to the next one down, although they cannot be mixed in the same string. Note that the connection here implementing circuit 3 differs from those in FIG. 4 and for that reason only the implementing circuit is numbered as 3A instead of 3.

Figure 5:
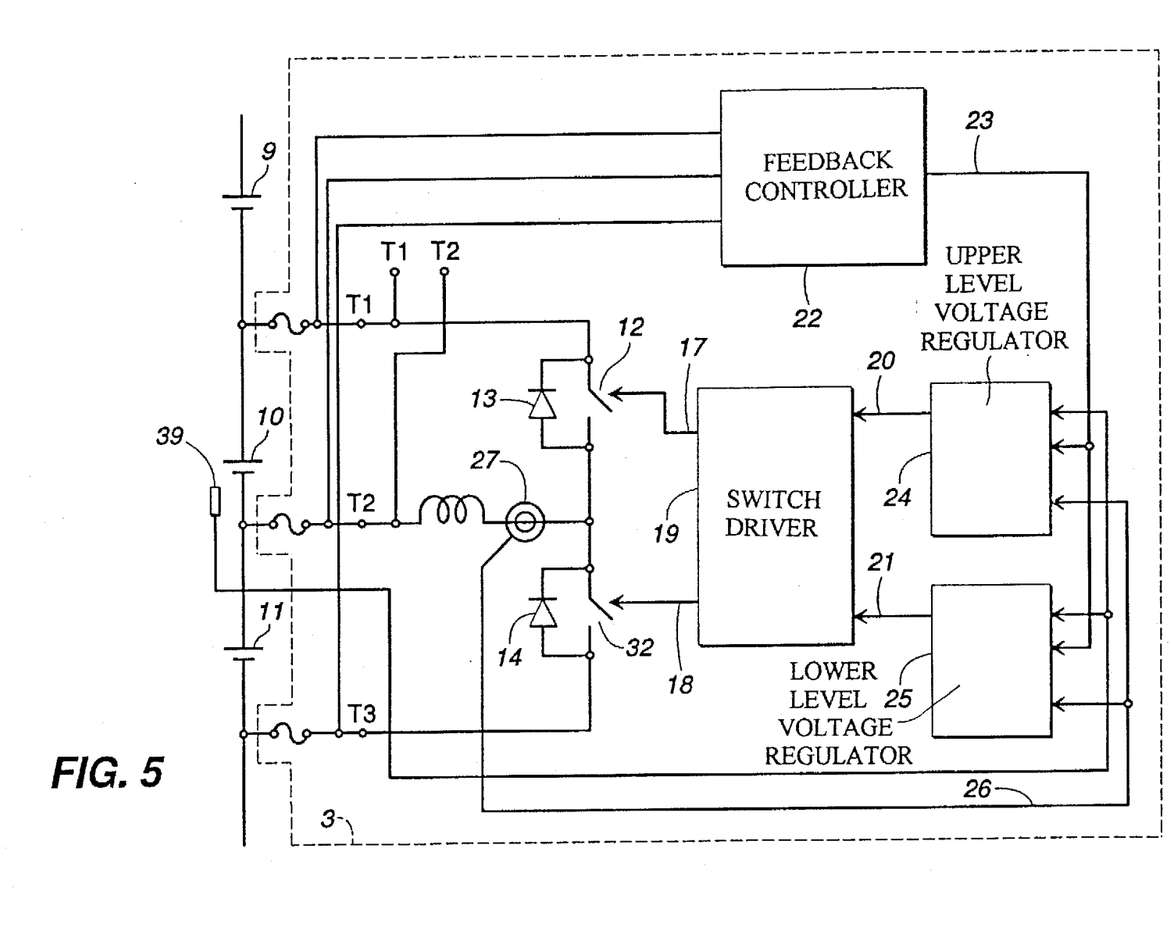
FIG. 5 is a circuit diagram that expands upon and more fully illustrates the circuit shown in FIG. 3.

With reference next to FIG. 5, the protector circuit 3 is shown in greater detail for use in transporting charge away from an overcharged battery in a battery string charging mode and for supplying charge to a charge drained battery. This schematic includes the circuit for controlling switches 12 and 32, which control circuits were not shown in FIG. 3.

Figure 6A:
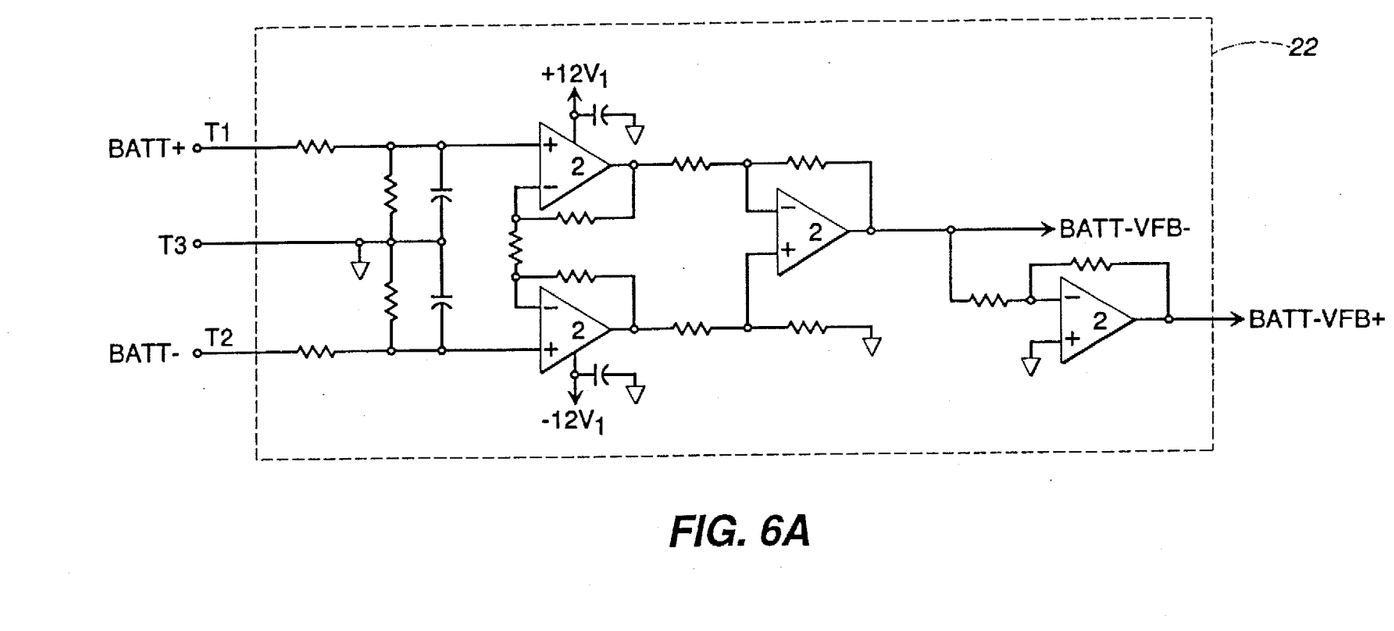
FIGS. 6A and 6B illustrate further details of elements of the circuit shown in FIG. 5.
Figure 6B:
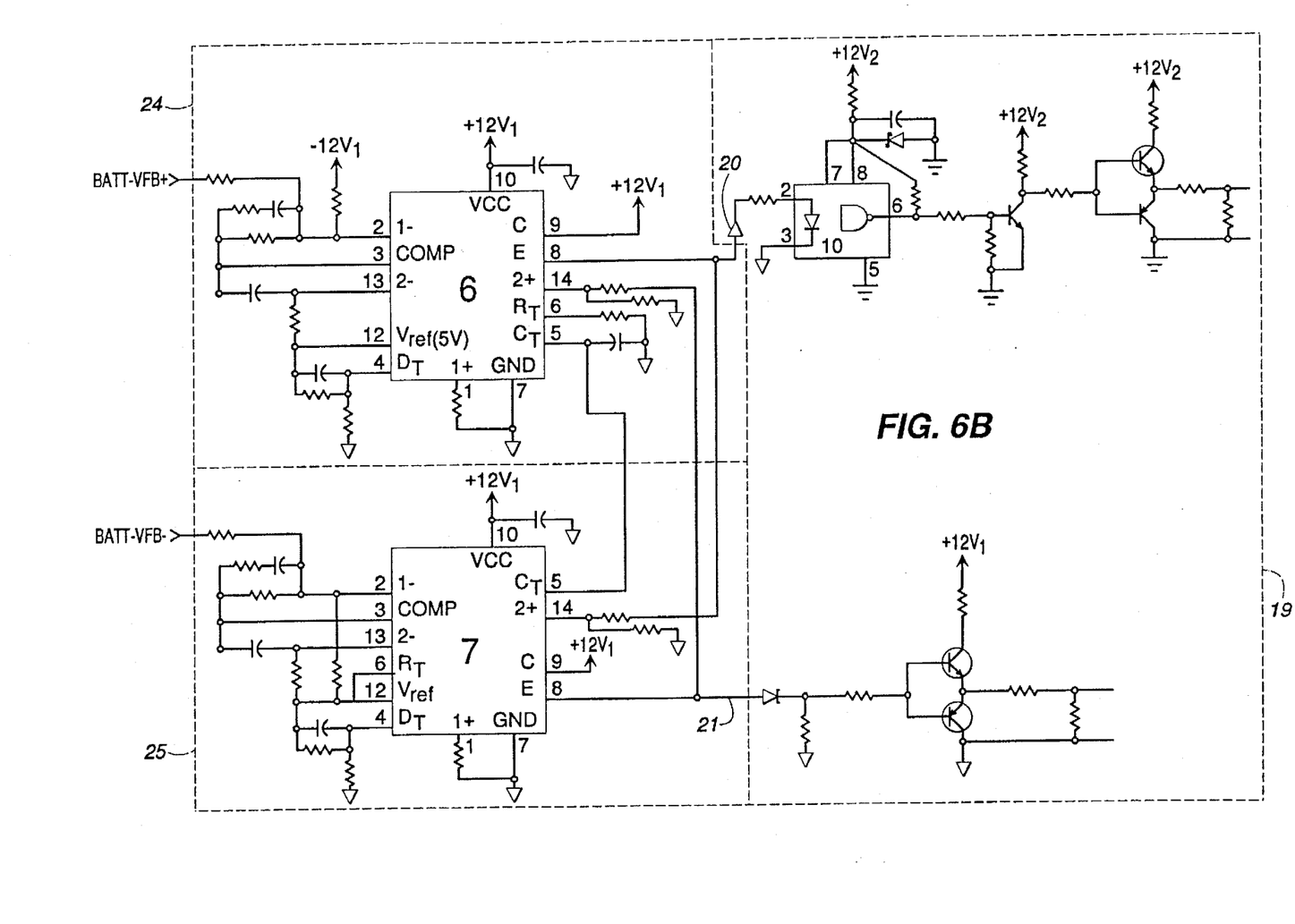

In FIG. 5 it is seen that switches 12 and 32 are operated by switch drivers 19. These drivers are shown in more detail in FIG. 6B as being comprised of a network of transistors that are controlled by logic signals transmitted over lines 20 and 21. A feedback amplifier 22 senses the voltage across battery 10. Its details are shown in FIG. 6A. It is connected to terminals T1, T2 and T3, as shown. The feedback controller emits analog signals over line 23 that are indicative of this sensed voltage. This signal is inputted to the voltage regulators 24 and 25, and to their integrated circuits 6 and 7, as shown in FIG. 6B. These voltage regulators, which preferably are Motorola IC chips MC33060A, serve to maintain the voltage level of the protected battery below its fully charged control level in the charging mode. In the discharge cycle, regulators 24 and 25 keep the voltage of the battery above its lowermost, operatively allowable level.

Regulator 24 controls the upper level while regulator 25 controls the lower level of the protected battery voltage. In doing this, logic digital signals emitted by regulators 24 and 25 are directed to switches 12 and 32 through signal interface 19 which in turn emit digital control signals to switches 12 and 32. Preferably switches 12 and 32 are MOSFET type switches suitable for low voltage and high current, although they could be other types of transistors, such as BJT or IGBT. As shown in FIG. 5, the circuit also includes a current sensor 27 adjacent to the inductor which is coupled to regulators 24 and 25 for peak current sensing. Here also the circuit is seen to include a temperature sensor 39 whose signals are also inputted into the regulators for more precise overcharged and drained voltage selection.

Figure 8:
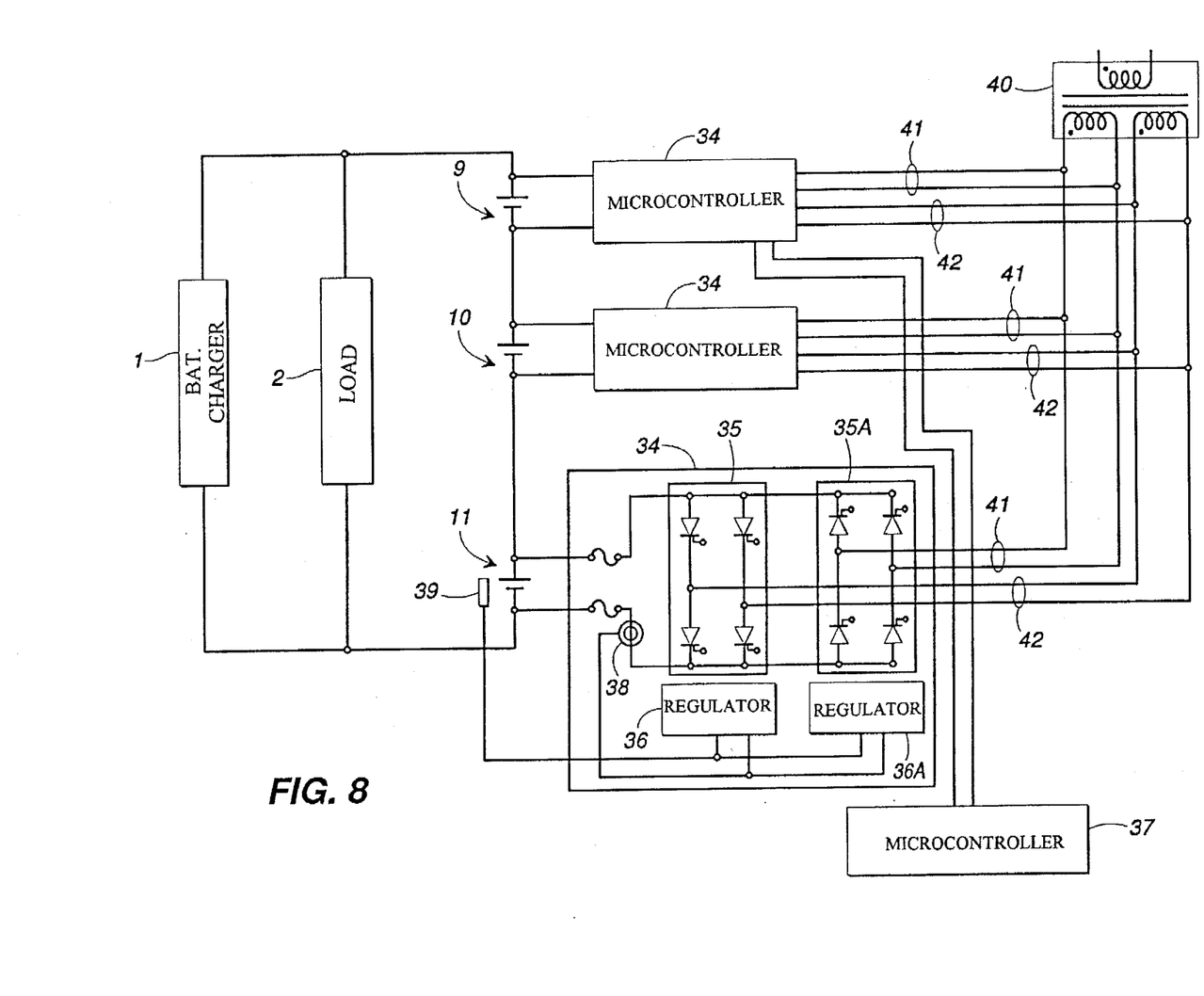
FIG. 8 is a circuit diagram of another preferred embodiment of the invention.

If desired, voltage regulator 24 and 25 may be deleted and their function performed with a microcontroller 37 as shown in FIG. 8. Here it is seen that the current sources 15 and 16, theoretically represented and discussed in FIGS. 1 and 2, are now provided to the protective circuit externally via transformer 40. The microcontroller is more efficient than the circuit of FIG. 3 but at the expense of operational speed. In operation assume that battery 10 is approaching overcharge during a charging cycle so that the excess charging energy is passed to battery 11. Eventually battery 11 will also approach an overcharged state. Though the circuit of FIG. 3 is quite simple, the excess charge is nevertheless passed to the next battery which in turn created the device for the sump battery of FIG. 4. The FIG. 8 circuit eliminates the need for this sump battery since it has an external power source and does not have the problem of transferring charge from one battery to the next. However this embodiment does require an external source of current and also has more of its conductors current carrying rather than only digital signal carrying. Thus, it is seen that here the theoretical current source 15, 16 of FIGS. 1 and 2 is provided externally while with the circuit of FIG. 3 the current source is provided internally of the battery string, with one battery drawing or shunting current from the next.

When all of the batteries in the string have been charged to say within a few percent of 12.8 V, since each battery in the string is evenly charged to the fully charged stage, no battery is overcharged. Since the protection circuit works only when any one battery in the string is overcharged, none of the protection circuits will operate when the string is evenly charged to full charge state. Hence it maintains highest efficiency of the system. If the entire string is overcharged, which is the major charger problem, the protection circuit will work to their full capacity trying to transfer charge to the sump battery to be dissipated externally.

As for full discharge state, each of the batteries in the string is discharged evenly, within a few percent of each other, say to 10.8 V, the system should stop loading the string. There is nothing that the protection circuit can do to remove the main load from the string. As long as none of the batteries in the string is over-drained, none of the protection circuits will be active. However, if any of the batteries in the string is discharged below say 10 V, the protection circuit will try to draw charge from the next battery to support the dangerously drained battery. Eventually, of course, protection circuits will work to their full capacity trying to maintain each battery voltage by transferring charge from the sump battery which obtains energy from external source.

It thus is seen that a method and means is now provided for protecting the individual batteries in a battery string from being excessively charged or discharged that substantially overcomes long persistent problems associated with the prior string management methods and means. It should of course be understood that many modifications may be made to the specific preferred embodiments described herein without departure from the spirit and scope of the invention as set forth in the following claims:

What is claimed is:

1. A power supply comprising a plurality of batteries connected in series circuit and shunt circuit means for shunting current about a battery in said series circuit in response to said battery being charged to a preselected upper charge limit; a sump battery connected in series circuit with said plurality of batteries series circuit; and a load connected across said sump battery.

2. A power supply comprising a plurality of batteries connected in series circuit and shunt circuit means for shunting current about a battery being discharged to a preselected lower charge discharge limit; a sump battery connected in series circuit with said plurality of batteries series circuit; and a load connected across said sump battery.

3. A power supply comprising a plurality of batteries connected in series circuit, energy transfer circuit means for transferring energy from one of said batteries to another of said batteries in response to said one battery being charged to a preselected upper charge limit, a sump battery connected to said series circuit, and means for regulating the voltage across said sump battery as to remove excess charging energy from the said series circuit.

4. A power supply comprising a plurality of batteries connected in series circuit and energy transfer circuit means for transferring energy from one of said batteries to another of said batteries in response to said one battery being charged to a preselected upper charge limit, and wherein said energy transfer circuit means comprises an inductor and means for coupling said inductor with said one battery in response to said one battery being charged to said preselected upper charge limit.

5. A power supply comprising a plurality of batteries connected in series circuit, energy transfer circuit means for transferring energy from one of said batteries to another of said batteries in response to said other battery being discharged to a preselected lower discharge limit, a sump battery connected to said series circuit, and means for regulating the voltage across said sump battery so as to supply additional energy to the said series circuit.

6. A power supply comprising a plurality of batteries connected in series circuit, energy transfer circuit means for transferring energy from one of said batteries to another of said batteries in response to said other battery being discharged to a preselected lower discharge limit, and wherein said energy transfer circuit means comprises an inductor and means for coupling said inductor across another battery in response to said another battery being discharged to said preselected lower discharge level.

7. A power supply comprising a plurality of batteries connected in series circuit and energy transfer circuit means for transferring energy between two batteries in said series circuit in response to either of the said adjacent batteries being charged to a preselected upper charge limit, and with said energy transfer circuit means comprising an inductor coupled across said two batteries by switch means and means for activating said switch means in response to either of the said two batteries being charged to said preselected upper charge limit.

8. A power supply comprising a plurality of batteries connected in series circuit and energy transfer circuit means for transferring energy between two batteries in said series circuity in response to either of the said adjacent batteries being discharged to a preselected lower discharge limit, and with said energy transfer circuity means comprising an inductor coupled across said two batteries by switch means and means for activating said switch means in response to either of said two batteries being discharged to said preselected lower discharge limit.

* * * * *